United States Patent [19]

Newman

[11] 4,023,511
[45] May 17, 1977

[54] SEED PLANTING ROLLER DEVICE

[76] Inventor: Dwight Clark Newman, R.R. 1, Culver, Ind. 46511

[22] Filed: Nov. 10, 1975

[21] Appl. No.: 630,131

[52] U.S. Cl. .................................. 111/89; 111/90; 111/91; 301/5 R; 301/16

[51] Int. Cl.² ...................... A01C 5/04; A01C 7/20

[58] Field of Search ............... 111/2, 3, 85, 91, 90, 111/89, 95, 74, 77, 78, 34, 36, 14, 79, 80; 221/185, 237, 252, 254, 265, 266, 277; 222/167, 169–172, 177, 367, 368, 369; 193/9; 172/261, 464, 471, 491; 301/12 M, 16, 5 R

[56] References Cited

UNITED STATES PATENTS

| 117,646 | 8/1871 | Knetzer | 111/74 |
|---|---|---|---|
| 169,041 | 10/1875 | Rittenhouse et al. | 111/90 |
| 341,994 | 5/1886 | Byrd | 222/177 |
| 489,446 | 1/1893 | Anderson | 301/5 R |
| 550,188 | 11/1895 | Matson | 111/90 |
| 1,093,462 | 4/1914 | Norris | 111/90 |
| 1,272,550 | 7/1918 | Smith | 111/74 |
| 1,389,060 | 8/1921 | Lippitz | 221/252 X |
| 1,462,847 | 7/1923 | Behrens | 222/367 |
| 1,556,850 | 10/1925 | Kuhe | 222/369 X |
| 1,604,624 | 10/1926 | White | 111/91 UX |
| 1,808,759 | 6/1931 | Bickerton | 172/464 |
| 2,168,855 | 8/1939 | Aspenes | 222/177 X |
| 2,340,240 | 1/1944 | White | 111/91 |
| 2,420,092 | 5/1947 | Otte | 111/74 |
| 2,445,698 | 7/1948 | Siebring | 222/368 X |
| 2,727,476 | 12/1955 | Jones | 111/91 |
| 3,204,589 | 9/1965 | Blackhurst et al. | 111/91 |
| 3,659,746 | 5/1972 | Winslow | 221/265 X |
| 3,796,346 | 3/1974 | Ribouleau | 111/77 X |

FOREIGN PATENTS OR APPLICATIONS

| 101,052 | 9/1925 | Austria | 111/91 |
|---|---|---|---|
| 698,467 | 1/1931 | France | 111/91 |
| 88,964 | 4/1967 | France | 111/85 |
| 2,011,995 | 9/1971 | Germany | 172/261 |
| 331,981 | 1/1921 | Germany | 111/91 |
| 6,085 | 9/1921 | Netherlands | 111/89 |

Primary Examiner—Edgar S. Burr
Assistant Examiner—Steven A. Bratlie
Attorney, Agent, or Firm—Garrettson Ellis

[57] ABSTRACT

An improved seed planting roller for planting seeds in individual holes in the ground, and having means for reclosing the hole over the planted seed. Also, means are shown for altering the circumference of the roller for adjustment of planted seed spacing.

21 Claims, 29 Drawing Figures

SEED PLANTING ROLLER DEVICE

BACKGROUND OF THE INVENTION

Commercial seed planting machinery is generally used in farming and other agricultural operations to plow a furrow for planting a seed of corn, soybeans, or the like, followed by the closing of the furrow over the seed, to retain moisture and to prevent birds from eating the seeds. In such commercial devices, for example the John Deere MaxEmerge planters, a V-shaped seed trench is carved out of the soil by a pair of angled discs, as the seed planter is dragged across a tilled field. The seeds are measured into a chute, to fall by gravity through the chute into the trench just behind the discs. Thereafter, a pair of wheels positioned behind the chute in angular relation to each other reclose the trench.

In this commerical system, it is generally necessary to plow under the stubble from the previous years' crop. A large amount of stubble on the field can interfere with the formation of the seed planting trench. A large quantity of corn stalks, for example, may be difficult for the trench-cutting discs to pass through without disruption of the seed planting trench.

Furthermore, there is a considerable amount of inaccuracy in seed spacing in the present commerical arrangements, since the velocity of the seeds falling down the chute may vary, resulting in irregular spacing. Also, a considerable amount of fuel is required to provide the energy to force open and then to close the many hundreds of seed trenches which must be produced in order to plant a field of corn or soybeans.

Also, with respect to the planting of soybeans, for example, it would be desirable to plant them in a square pattern about four to seven inches on a side, rather than planting them in more widely spaced rows of perhaps twelve inches, but only perhaps two inches apart in the row, as is one present practice. However, the present commercial structures cannot effectively plant seeds in such narrow rows, since the plowing action required to create and then to close up a seed trench can interfere with its neighbor seed trenches at such close spacing.

Furthermore, the presently available commercial equipment cannot readily be used to plant, for example, both corn and soybeans, in view of the large spacing required between corn plants, and the desired narrow spacing of soybean plants.

In accordance with this invention, an improved, roller-type seed planting device is disclosed, having substantial advantages over the present, commercially available seed planting devices, as well as various old, prior art roller-type seed planting devices.

As an example of such roller-type devices, Harriman U.S. Pat. No. 29,691 discloses a roller-type grain drill in which a hollow roller carries a series of hollow protrusions, which punch holes in the ground as the roller is moved therealong. Means are provided for dropping seeds into each of the protrusions, which have an opening to release a seed into each formed hole in the ground. However, there is a considerable possibility that the hole of each protrusion may become clogged by lumps of earth or the like, and thus become inoperative. Furthermore, the seed can be expected to remain largely uncovered in its newly formed hole, and is thus subject to being eaten by birds, and the failure of germination because of excessive dryness.

White U.S. Pat. No. 2,340,240 also discloses a hollow, seed planting roller having hollow protrusions for digging a hole and depositing seed therein. A trap door like arrangement is contemplated for closing an aperture in the hollow projection, except while in contact with the ground, at which time it is intended to open to deposit the seed. However, in this structure, as in the previous, the seed will tend to remain on the surface of the ground and not be buried. Furthermore, there is the possibility that many of the seeds will be scooped out of the hole by the rolling device after it is deposited, to remain in exposed, vulnerable position on the bare field.

Other rotary seed planting devices are disclosed, for example, in Pogue U.S. Pat. No. 372,564 and Lesser U.S. Pat. No. 1,068,673. In each of these patents, the same disadvantages exist as described above, which appears to be one reason why these structures never have achieved significant commercial success.

The improved seed planting device of this invention, being of the roller type, can plant seeds without difficulty in a field thickly laden with stubble. Accordingly, the stubble can function as a mulch, while also acting as a blanket to reduce moisture loss from the field and weed growth. Furthermore, the amount of fuel required to propel the planting device of this invention is much less than in conventional seed planting devices which create a seed planting trench. A large amount of energy is required to create such a trench, as well as to close it up again in the present, commercial manner.

Also, the seed planting device of this invention can precisely position the seeds in any desired planting pattern; even a close planting pattern for soybeans or the like, for example, of four to seven inches square. The device deposits seeds in individually created holes, and is capable of at least partially reclosing the hole thus created, to bury the seed at a predetermined, uniform, desired depth for optimum germination conditions.

Furthermore, the device of this invention can be finely adjusted for making small changes in the pattern of seed distribution. For example, this invention can be utilized to manufacture a device capable of varying the spacing between seeds by a matter of one inch or less. The difference between a square seed pattern of spacing 4.5 inches on a side, and a square pattern of seed spacing of 5.5 inches results in a seed population difference of approximately one hundred thousand seeds per acre (about 310,000 seeds in the one case, as against about 207,000 seeds in the other).

As a further advantage, the seed planting device of this invention is capable of compensating for hillocks and depressions in a field, producing the same desired, even, accurate pattern of seed dispersion without missing certain depressed areas, with the resultant failure of crop growth in that particular area.

The device of this invention can be used to plant any desired seed, including corn, soybeans, grass seed, tomatoes and other vegetables, or wheat, and can also be used to apply other materials such as fertilizers, insecticides, nematocides, and fungicides.

DESCRIPTION OF THE INVENTION

In accordance with this invention, a seed planting device is provided having a roller member positioned on an axle for rolling contact with the ground. Protrusions are carried on the periphery of the roller for producing holes in the ground, and then for withdrawing from the holes as the roller member continues its rolling action along the ground. Means are also provided for depositing seed into the holes thus formed, typically from inside of the roller to the hole through an aperture in the protrusion, the aperture being typically positioned opposite to the direction of rotation of the roller member.

In accordance with this invention, additional shovel means are provided, carried on the periphery of the roller, for entering the ground adjacent the holes while rolling, and for dislodging dirt into the holes, to cover the seed or the like which has been deposited therein by the present device.

The seed planting device of this invention may have protrusions which each define a forward, convex wall facing the direction of rotation of the roller member. As stated above, the aperture for seed delivery may face away from the direction of rotation.

It is desirable for a closure member to be positioned on the periphery of the roller member and in pivoting relationship to it, to close the aperture, in a first pivoting position, and to open it in a second pivoting position. A spring or equivalent means biases the closure member into a first, closed position, while a foot member, rigidly attached at one end to the closure member, and positioned essentially tangentially of the periphery of the roller member in the closed position, is utilized to automatically open the closure member after the hole has been punched or dug by the protrusion. The other end of the foot member is spaced from the roller member periphery; accordingly, contact of the foot member with the ground depresses it against the periphery and causes the closure member to assume its second, open position, to allow the seed to be deposited therein.

As soon as release from ground contact is effected, the closure member returns to its first, closed position. The additional shovel means typically comprises plates projecting outwardly from the periphery of the roller member, inclining in the direction of rotation of the roller member.

As an additional aspect of this invention, the protrusions mentioned above are carried on separate, peripheral plates which define the periphery of the roller member. The peripheral plates may be carried on the ends of radially mounted, extensible spokes equipped with spoke radius varying means. It is desirable for sliding link members to connect the peripheral plates, whereby the peripheral plates may be uniformly moved radially inwardly and outwardly by adjustment of the extensible spokes, to adjust the peripheral distance between the protrusions carried on the peripheral plates.

As a result of this, a small adjustment of the distance between individually planted seeds may be easily effected, simply by adjustment of the radius of the extensible spokes, to achieve the desired change in spacing. As stated before, this can result in a very significant difference in the seed population per acre, and can provide a degree of precision of close planting which has been hitherto unobtainable for large scale farming.

In the drawings,

FIG. 1 is a perspective view of a plurality of one embodiment of the roller members of this invention, shown fastened to a tool bar for operation of the rollers for the planting of seed or the like.

Referring to FIGS. 1 through 7, one relatively simple embodiment of the structure of this invention is disclosed.

Figure 1:
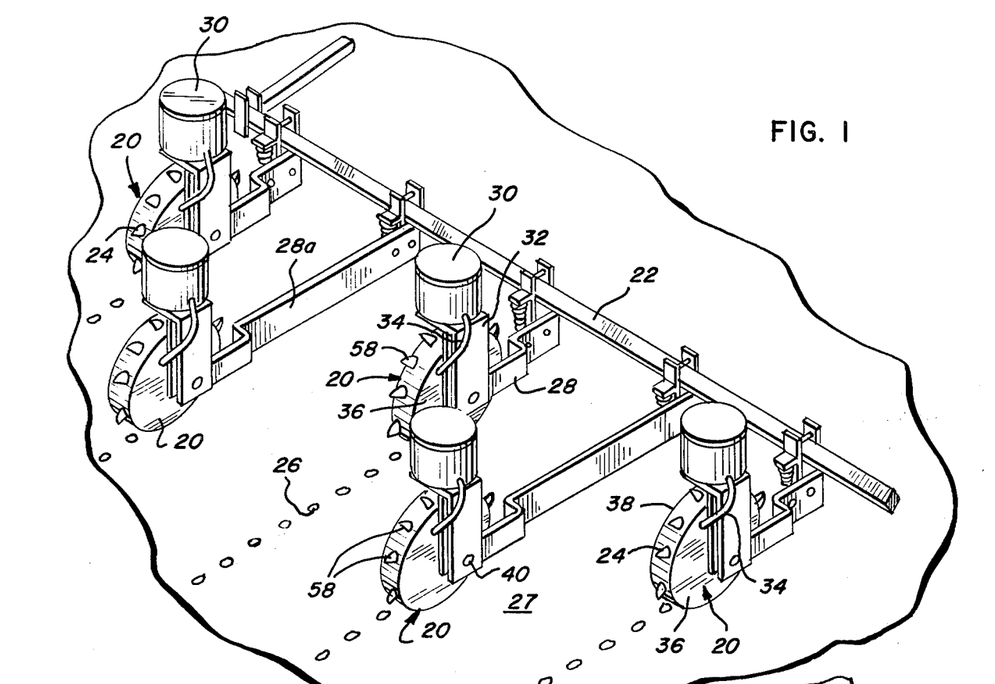

As shown in FIG. 1, several of the seed planting rollers 20 of this invention are shown attached to a tool bar 22, which may be propelled by a tractor in any conventional manner. Rollers 20 each define protrusions 58 about their peripheries, for drilling holes 26 in the ground 27, and then partially refilling them again after having deposited a seed.

As shown, the linear spacing of holes 26 is governed by the spacing of protrusions 58 on the periphery of rollers 20. In the particular embodiment of FIGS. 1 through 7, this spacing may be adjusted by temporarily blocking the interior of any desired protrusions with gummy material or the like, to prevent seed from being deposited by the particular protrusion 58. For example, if every second protrusion is so blocked, the spacing between planted seeds, and holes 26, will of course be doubled.

The lateral spacing between rows of seeds is adjusted as desired by the spacing of rollers 20 along tool bar 22. As shown in FIG. 1, rollers 20 may be attached to tool bar 22 by metal arm 28, which may be pivotally spring mounted, to permit each roller 20 to individually accomodate small hillocks and holes in the field, for more effective seed distribution. When close spacing of seed rows is desired, some of rollers 20 may be carried by long arms 28a, so that they do not interfere with the operation of their neighbor rollers. However, since a furrow is not plowed, but rollers 20 only punch individual holes into the ground, and then partially fill them again, there is essentially no interference between adjacent rollers, unless they are in actual physical contact with each other.

Seed storage chambers 30 are shown to be positioned on top of a bracket 32, which is in turn attached to arm 28. From there, the seed passes through a seed tube 34 to the interior of a stationary drum 36, which is also attached to bracket 32. Rotatable drum 38 is carried by stationary drum 36, and connected thereto by axle 40 for rotation about stationary drum 36, as particularly shown in FIGS. 2 and 3.

Figure 2:
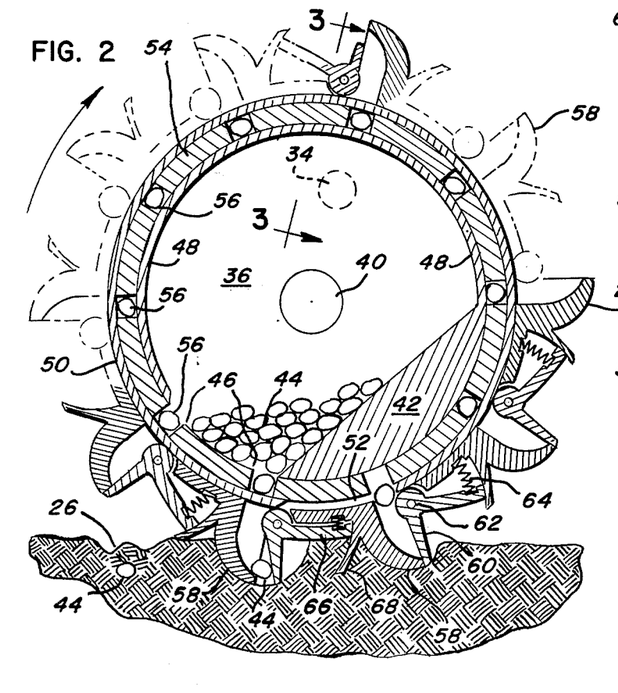
FIG. 2 is a longitudinal sectional view of the embodiment of roller member shown in FIG. 1.
Figure 3:
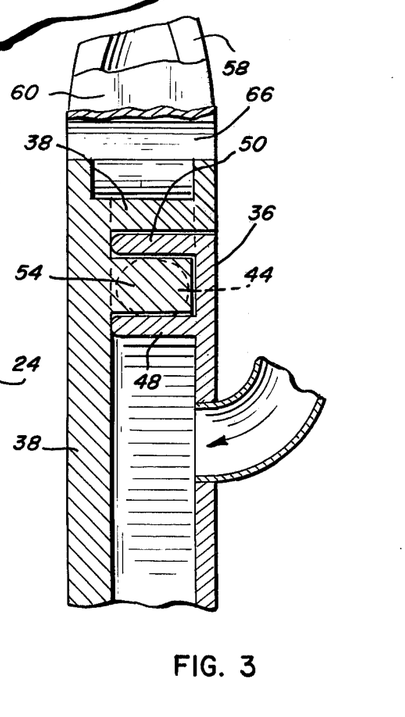
FIG. 3 is a sectional view taken along line 3—3 of FIG. 2.

Seed falls through seed tube 34 into a chamber defined inside stationary drum 36. Filled-in section 42 guides seed 44 toward circumferential aperture 46 in the otherwise-intact inner circumferential wall 48 of stationary drum. Aperture 46 is positioned adjacent the downward portion of stationary drum 36.

Drum 36 also defines outer circumferential wall 50, which overlies aperture 46, but in turn defines an aperture 52.

Rotatable drum 38, in turn, defines an interrupted ring portion 54, carried on drum 38, and interspersed with spaced 56 for receiving seed through aperture 46, when spaces 56 come into communication with the aperture. Thereafter, as rotatable drum 38 rolls, the individual seeds are carried in spaces 56, in a clockwise manner as shown in FIG. 2, circumferentially between inner and outer walls 48, 50 of the stationary drum, being retained by interrupted ring 54, until the seed has been brought around to aperture 52. Then the seed 44 falls into the hollow space defined in protrusion 58 as shown at the bottom of FIG. 2.

The above technique provides an effective system for metering individual or very small numbers of seeds, prior to depositing them, with uniform spacing, into holes 26 made by protrusions 58.

Protrusions 58 define an aperture to the exterior, which is normally closed by closure member 60, attached to the rotatable drum by hinge 62, and biased in closed position by spring 64.

Figures 5, 6, 6A, 7:
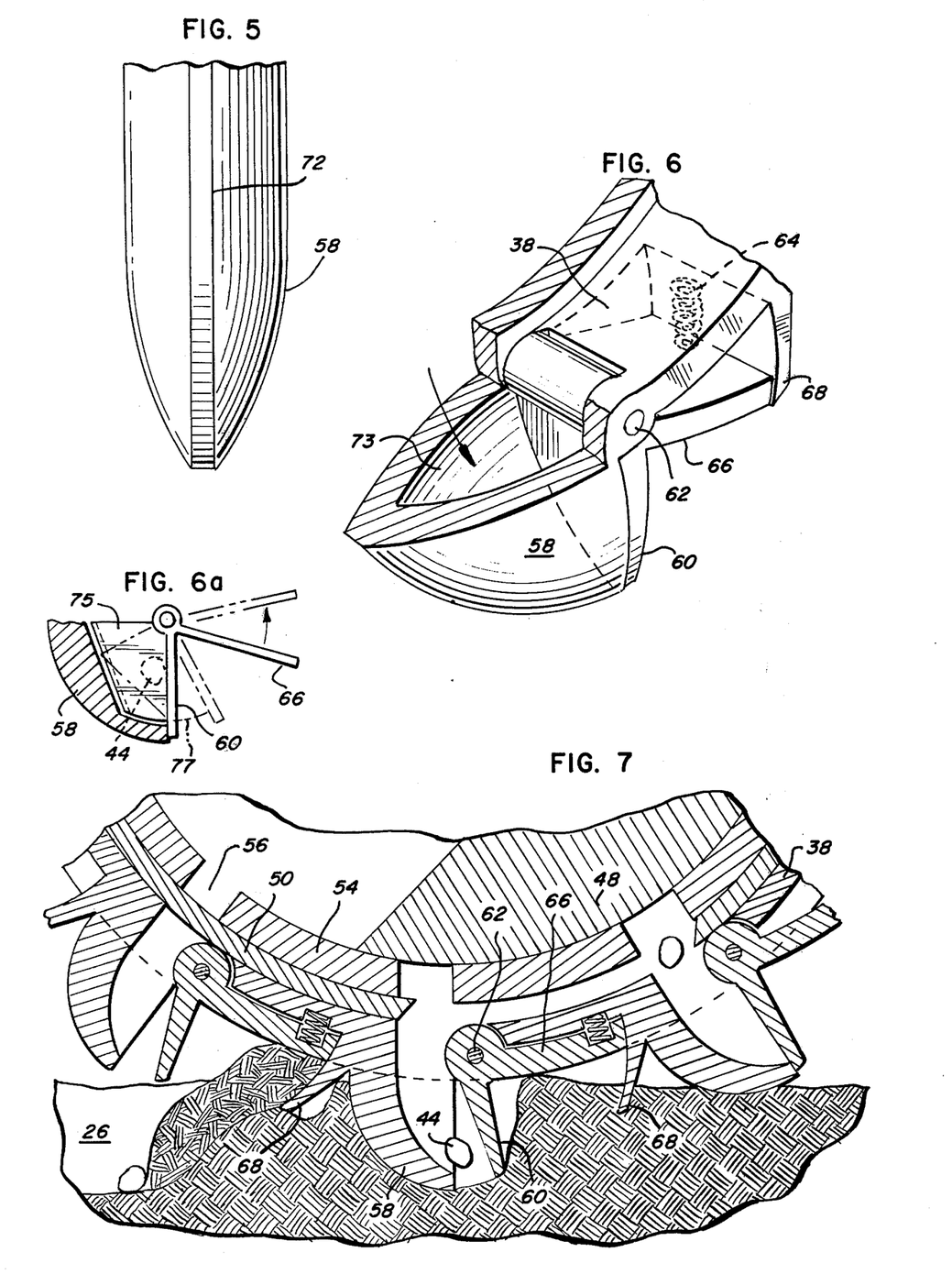
FIG. 5 is an enlarged, elevational view of a protrusion mounted on the periphery of the roller member of FIG. 1, showing the forward, convex wall which faces the direction of rotation.
FIG. 6 is an enlarged, perspective view of the protrusion of FIG. 5, and related structure, with some of the periphery of the roller member removed.
FIG. 6a is a fragmentary elevational view of a modification of the structure of FIG. 6.
FIG. 7 is an enlarged sectional view of a portion of the roller member of FIG. 1 in operation.

Closure member 60 is a trap door structure proportioned to block the open aperture of protrusion 58, except in the instance when pressure is exerted upon foot 66 by the ground, as particularly shown in FIG. 7. In the instance when a particular foot 66 is pressed against the ground, closure member 60 is forced to rotate in the counterclockwise direction about hinge 62, to open the aperture in the associated protrusion 58, allowing seed 44 to fall into the hole in the ground that had been made by the rolling protrusion.

When rotatable drum 38 continues its rotation so that there is no longer ground pressure against an individual foot 66, closure member 60 is allowed once again to close, and the associated protrusion 58 will rotate along with the entire roller 20, until it is again entering into engagement with the ground, prior to receiving another seed for planting.

Rotatable drum 38 also carries a plurality of auxiliary shovel members 68, which are positioned to partially reclose hole 26 after seed 44 has been dropped into it, burying the seed.

The hole-forming action of protrusion 58 and the reclosing action of shovel member 68 are shown in an exemplary manner in FIG. 4, although the specific nature of the hole-forming and reclosing action will vary to some degree depending upon the exact shape of the parts and the precise nature and texture of the ground.

Figure 4A:
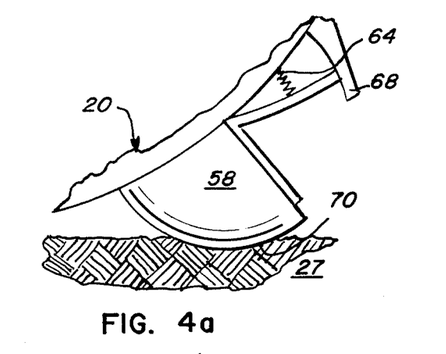
FIGS. 4a through 4h exhibit the action of the roller member of this invention in the process of punching a hole in the ground, depositing a seed, and covering the seed so deposited with earth.

As shown in FIG. 4a, a fragment of roller 20 is shown rolling in clockwise direction, bringing a protrusion 58 into contact with the ground.

Figure 4B:
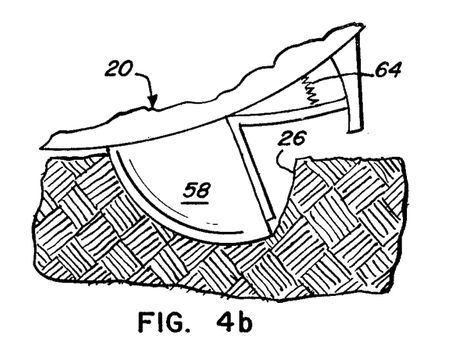

In FIG. 4b, further counterclockwise rotation of roller 20 has taken place, causing protrusion 58 to break into the ground surface to form a hole 26.

Figure 4C:
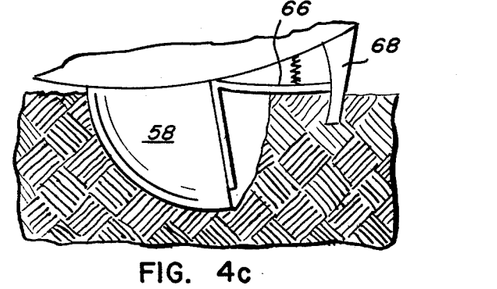

FIG. 4c shows the initial contact of the ground against foot 66, and the entry of shovel member 68 into the ground in relatively straight manner.

Figure 4D:
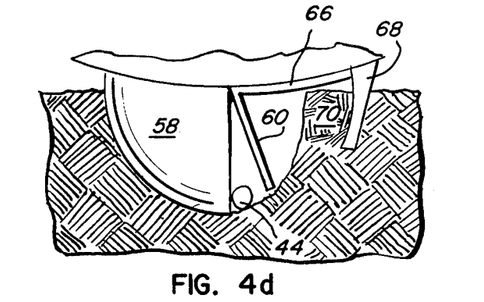

FIG. 4d shows the displacement of foot 66, opening closure member 60, which in turn allows seed 44 to spill out. In the meanwhile, the additional rotation causes shovel member 68 to begin to break loose a chunk of earth 70 for displacement on top of the seed.

Figure 4E:
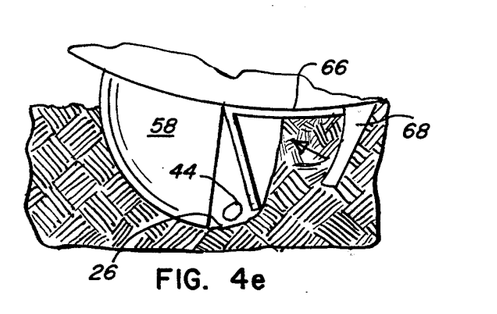

FIG. 4e shows protrusion 58 beginning to be lifted out of hole 26 as further clockwise rotation takes place.

Figure 4F:
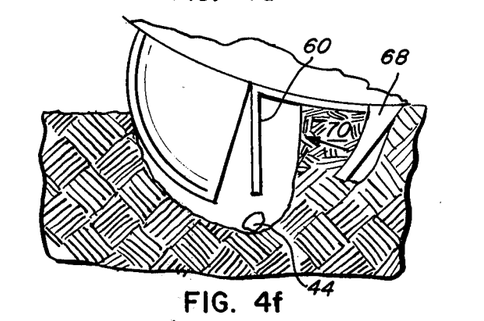

FIG. 4f shows this process in a more advanced stage, and also shows shovel member 68 beginning to be lifted upwardly, and moving earth portion 70 upwardly and over seed 44.

Figure 4G:
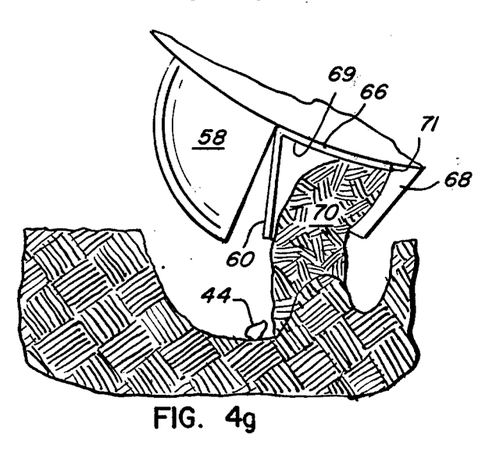
Figure 4H:
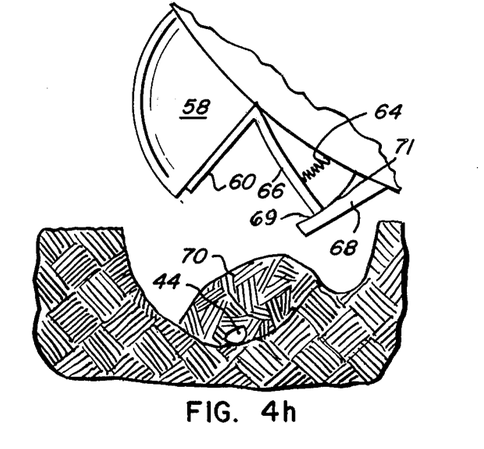

Thereafter, in FIGS. 4g and 4h, earth portion 70 is shown to be spilled over seed 44, as shovel member 68 is lifted upwardly due to the further rotation of roller 20. As foot 66 is pushed back to its normal position by spring 64, it can scrape shovel member 68 free of dirt, and can forcefully impel the dirt down onto seed 44. The rearward face 69 of shovel member 68 is desirably positioned adjacent the swinging path of end 71 of foot 66, and is of a shape corresponding to the arc of the swinging path of end 71, to achieve this purpose.

As a result of this, it can be seen that individual seeds are placed in holes formed by the protrusions, and released by the opening of the closure member when the hole is formed. Thereafter, as the protrusion is withdrawn, a shovel member spills dirt over the seed for its protection, all in a completely automatic and precise manner.

FIG. 5 shows the forward end of protrusion 58, as well as reinforced, flat portion 72, which may optionally be present to strengthen the structure, for protection against encountering rocks and the like as it digs into the ground, forming holes 26.

FIG. 6 is a fragmentary perspective view of a detached protrusion 58, showing its upper aperture 73 into which seed falls from spaces 56 in ring portion 54, and also showing the related parts of the apparatus.

In FIG. 6a, a cup member 75, having an open top and bottom, is attached to the inner wall of closure member 60. Accordingly, upon pressing of foot 66, cup member 75 is biased outwardly, forcing seed 44 out of protrusion 58 by allowing it to fall out of the open bottom 77 of cup member 75.

Referring now to FIGS. 8 through 17, a second embodiment of the device of this invention is shown. The basic functioning of this second embodiment is similar to the embodiment of FIGS. 1 through 7. However, this present embodiment has the additional advantage of providing a roller with an adjustable circumference.

Accordingly, the spacing between adjacent seed holes in an individual row can be adjusted for a wide, continuous range of different spacings, as may be desired. For example, in FIG. 8, roller 74 is shown for illustrative purposes both with an expanded periphery 76, and an alternative, contracted periphery 78. As can be seen, the spacing between the respective protrusions 58a in the contracted configuration is much less than in the spacing between the same protrusions 58a in the expanded configuration 76.

Figure 8:
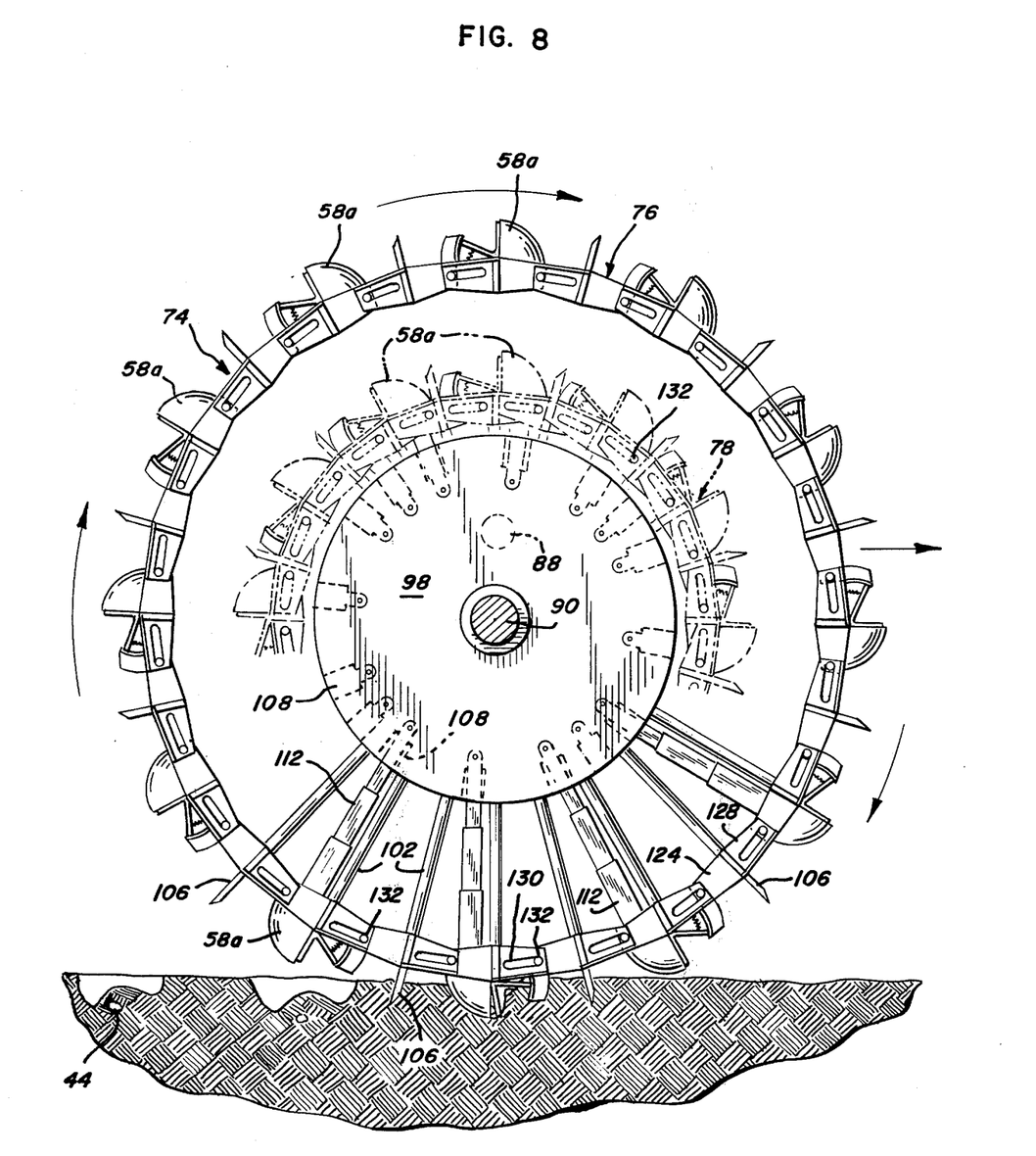
FIG. 8 is an elevational view of another embodiment of a roller member of this invention, having an adjustable periphery for varying the spacing of the protrusions carried thereby, with two adjustable positions shown, and some repetitious parts not shown for purposes of clarity.

If a greater variability of expansion is desired than this, various protrusions 58a may be easily removed, or may be blocked in any desired manner, so that seed is not provided to the protrusion. If alternate protrusions 58a are removed or are otherwise disabled, the spacing between the seeds planted can be doubled. If only every fourth protrusion is allowed to function in the manner intended, the seed spacing can be doubled again.

Any pattern of operative protrusions can be utilized on the roller of this invention, down to a single operating protrusion on the roller, for maximum seed spacing. This of course can be used in combination with the adjustable circumference feature of the embodiment of FIGS. 8 through 18, to provide a seed spacing capability over a very wide range, while being infinitely variable through the entire range.

It should be understood that each operating protrusion 58a will have an associated set of auxiliary seed-feeding and structural parts such as members 102 and 112 described below, although many of such parts have been removed from FIG. 8 for purposes of clarity. The bottom of the roller of FIG. 8 illustrates the parts associated with each protrusion 58a.

Figures 9, 10:
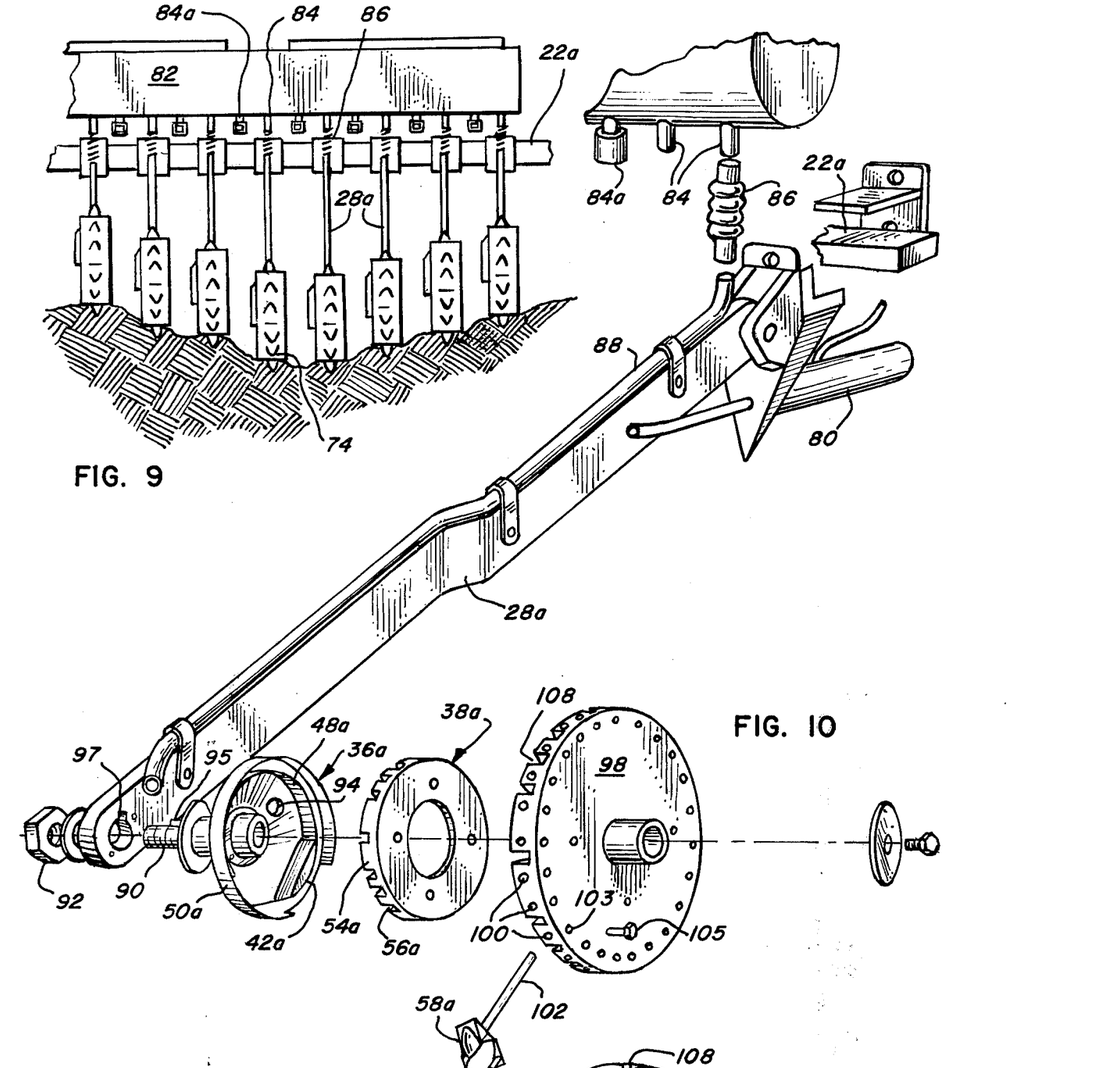
FIG. 9 is an elevational view of a plurality of the rollers of FIG. 8, shown spring-mounted on a tool bar and in operation in a field.
FIG. 10 is a perspective, exploded view of one of the rollers of FIG. 9, carried on an arm, with various parts removed.
Figure 11:
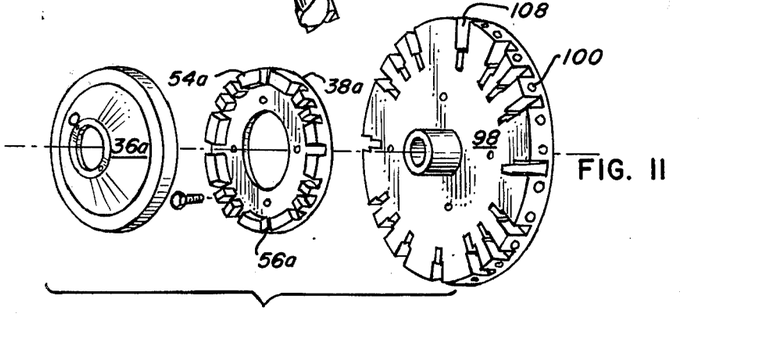
FIG. 11 is an exploded perspective view, taken from another angle, of some parts of the device of FIG. 10.

As shown in FIGS. 9 through 11, roller 74 can be spaced in any desired manner along a tool bar 22a, which may be similar to that shown in the previous embodiment. Rollers 74 may be carried by arms 28a, which are shown to be pivotally mounted, being urged downwardly by a pneumatic cylinder 80 to permit accomodation of the irregularities in the ground. The individual pneumatic cylinders 80 may be interconnected to provide a uniform pressure at all times in each cylinder.

Seed container 82 has a plurality of outlets 84 for providing seed to each roller 74. The unused outlets 84a are capped, being provided for use when a closer spacing of rollers 74 is desired.

As shown in FIG. 10, hose 86 provides communication between a seed outlet 84 and seed conduit 88, which is attached to arm 28a.

The individual parts of roller member 74 fit upon pin 90, which serves as an axle. The parts are retained on pin 90 by a nut member 92 or the like.

Stationary drum 36a is attached to arm 28a in immovable reaction thereto, and is similar in structure to stationary drum 36 of the previous embodiment. Seed tube 88 passes through aperture 94, to provide seed to the chamber defined between stationary drum 36a and rotatable drum 38a which, in turn, is similar in structure and function to rotatable drum 38, as described previously. Ridge 95 of bolt 90 fits into keyway 97 to prevent its rotation, and drum 36a may be bolted to arm 28a.

In this embodiment, rotatable drum 38a is attached by bolting or the like to wheel hub 98, which carries a series of uniformly spaced radial apertures 100 for receiving spokes 102 in adjustable radial positions, to provide an adjustable-diameter roller.

Spokes 102 can carry protrusions 58a, which are similar in structure to protrusions 58 of the previous embodiment, as well as closure members 60a, hinges 62a, springs 64a, and feet 66a, (FIG. 17) which are also similar in function to the previous embodiment.

In this particular embodiment, shovel member 104 (see in particular FIG. 12) is a double shovel member, positioned on both sides of protrusion 58a and positioned in angular relation thereto, to throw dirt inwardly as well as rearwardly as wheel hub 98 rotates in a clockwise manner, to partially fill in the hole formed by the associated protrusion 58a.

Figures 15, 16, 17:
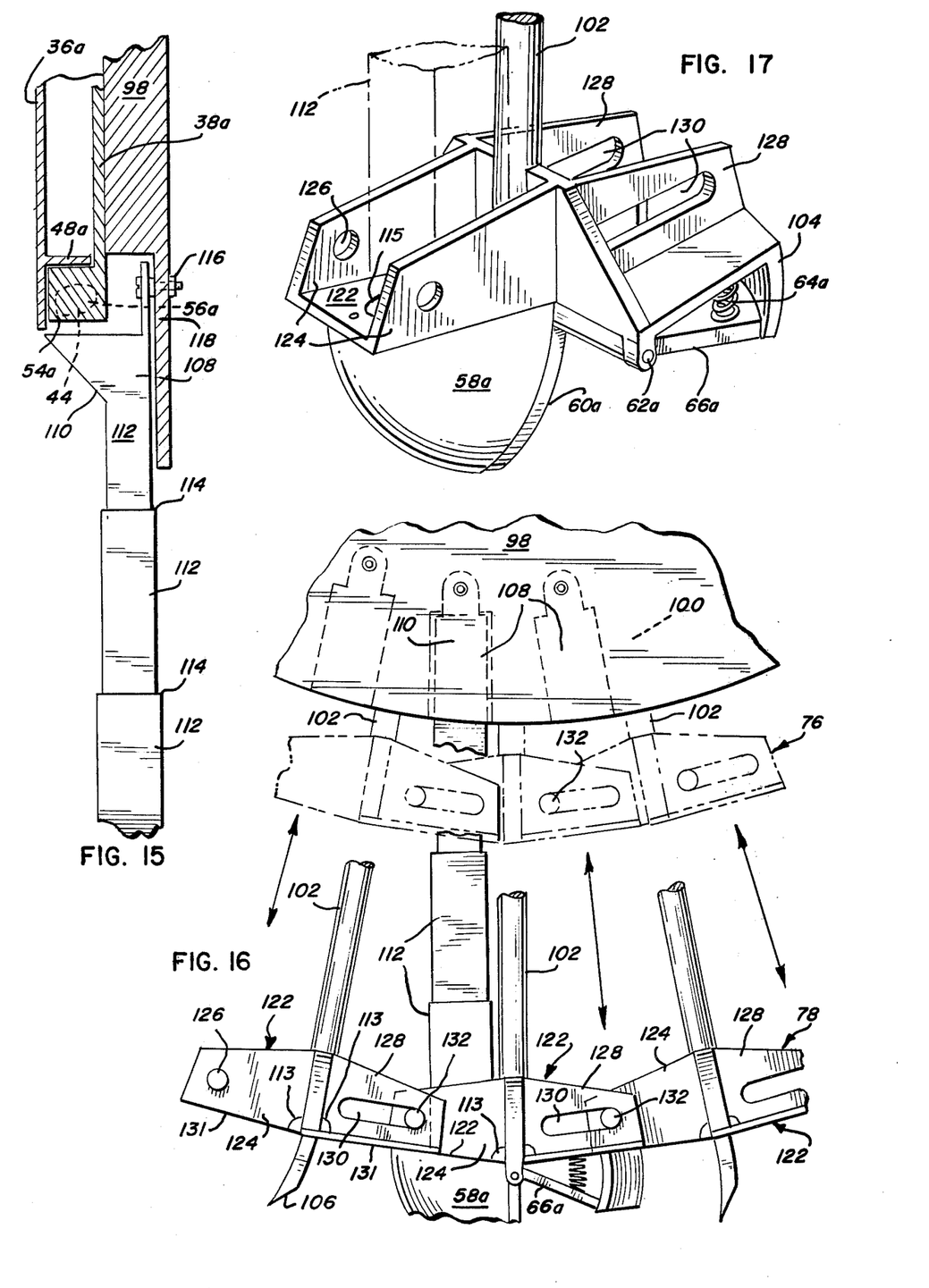
FIG. 15 is a detailed sectional view of a set of telescoping members of this invention, and showing a seed dropping therethrough.
FIG. 16 is a fragmentary, elevational view of a portion of the roller of FIG. 8, showing details of how the structure can be expanded to an increased diameter for adjustment of seed spacing, and showing two different radial positions.
FIG. 17 is a detailed perspective view of the protrusion member and the additional shovel means which can be utilized in the structure of FIG. 8.

As shown in FIGS. 8 and 16, every other spoke 102 can carry cleat members 106, to provide traction for roller 74, and to prevent slippage, which would disrupt the even seed distribution pattern provided by this device.

As shown in FIG. 8, spokes 102 carry in alternating relationship a protrusion 58a and a cleat member 106. If few protrusions 58a are desired to be used, they may be removed and replaced with additional cleat members 106.

Stationary drum 36a carries an inner circumferential wall 48a and an outer circumferential wall 50a, as well as filled section 42a, for functioning in a manner similar to that of the previous embodiment.

Movable drum 38a defines an interrupted ring portion 54a, having spaces 56a for functioning as in the previous embodiment. Spaces 56a may be non-uniformly positioned in ring 54a, but are positioned in registry with corresponding spaces 108 in wheel hub 98, for purposes of seed distribution. Spaces 56a and 108, in the pattern shown (see FIGS. 11 and 19) permit the installation of sections 112 and the consequent feeding of seed to a variable number of operative seed distributing protrusions 58a, installed on spokes 102 at alternatively variable angular spacings of 30°, 45°, 60°, 90°, 120°, or 180°, for any desired gross variability of the spacing of seeds. These angles correspond respectively to 12, 8, 6, 4, 3, or 2 seed distributing protrusions, uniformly spaced about roller 74 by the user when and as desired.

Fine adjustment of the seed spacing can then be accomplished by varying the amount of radial insertion of spokes 102 into holes 100, to achieve the desired circumference, along with the desired adjusted spacing of seed-depositing protrusions 58a. Spaces 108 and sections 112 permit the operative distribution of seed to the protrusions 58a in a manner to be described below.

Figures 19, 21:
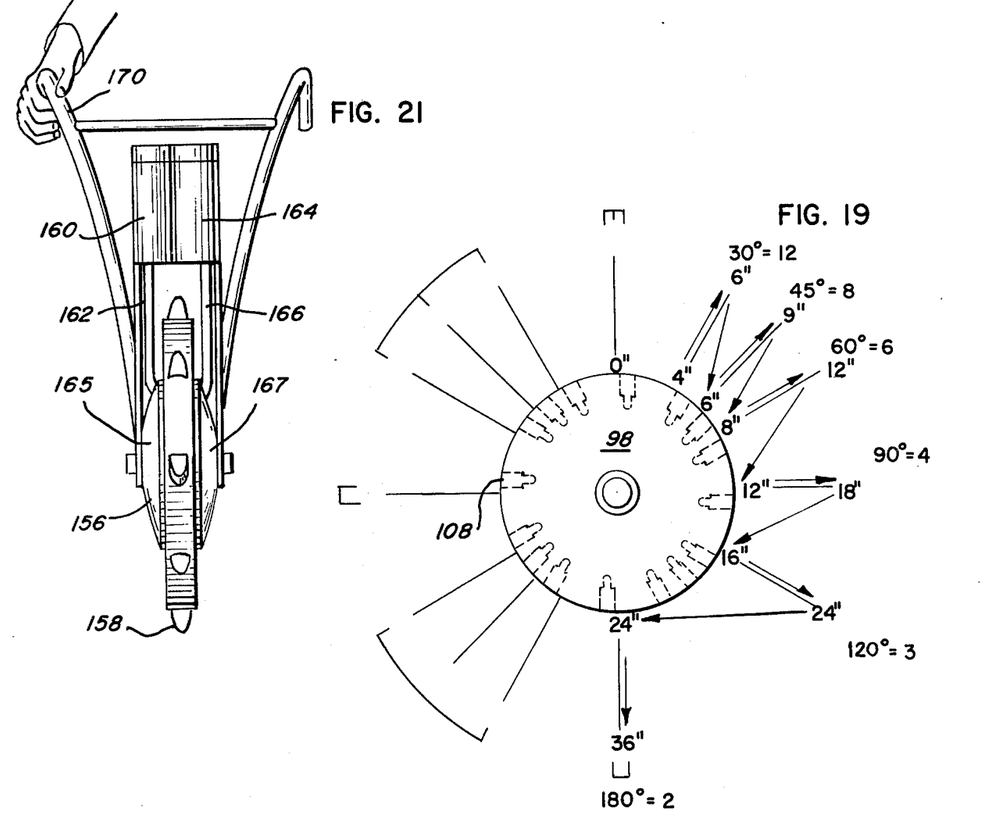
FIG. 19 is a plan view of the wheel hub of this invention, showing the plan of distribution of the spaces provided for receiving the seed-delivering telescoping sections as shown in FIG. 12.
FIG. 21 discloses a single, manually operated planting device in accordance with this invention.

When roller 74 is of appropriate size, for example a wheel hub 98 having a diameter of 12 ⅞ inches, and projections 58a projecting outwardly from the periphery of wheel hub 98 by a minimum of 1 ¼ inches at minimum extension 78, and 3 3/16 inches at maximum extension 76, the seed spacings provided on the ground will be essentially as indicated in FIG. 19, i.e. 4 to 6 inches with a 30° spacing of protrusion 58a; 6 to 9 inches with a 45° spacing; 8 to 12 inches with a 60° spacing; 12 to 18 inches with a 90° spacing; 15 to 24 inches with a 120° spacing; and 24 to 36 inches with a 180° spacing. Thus, by proper adjustment of the member and extension of protrusions 58a, roller 74 can accurately space seeds or the like from 4 to 36 inches apart.

As shown in FIGS. 9, 12, 15 and 16 through 18, seed is transported out of spaces 56a, by means of guide member 110, into a corresponding space 108. There, extensible telescoping tubular sections 112 are provided, having convoluted ends 114, which interlock to prevent separation of sections 112. These extensible telescoping sections extend approximately parallel to spokes 102, with one end of the telescoping sections being attached to wheel hub 98 and the other end communicating with the aperture 115 within protrusion 58a. Accordingly, as each spoke 102 is radially extended or contracted within holes 100, to enlarge or reduce the radius and circumference of roller 74, telescoping members 112 correspondingly extend and contract their respective lengths, providing a closed conduit for the distribution of seed from drums 36a, 38a to the individual seed planting protrusions 58a.

Figure 12:
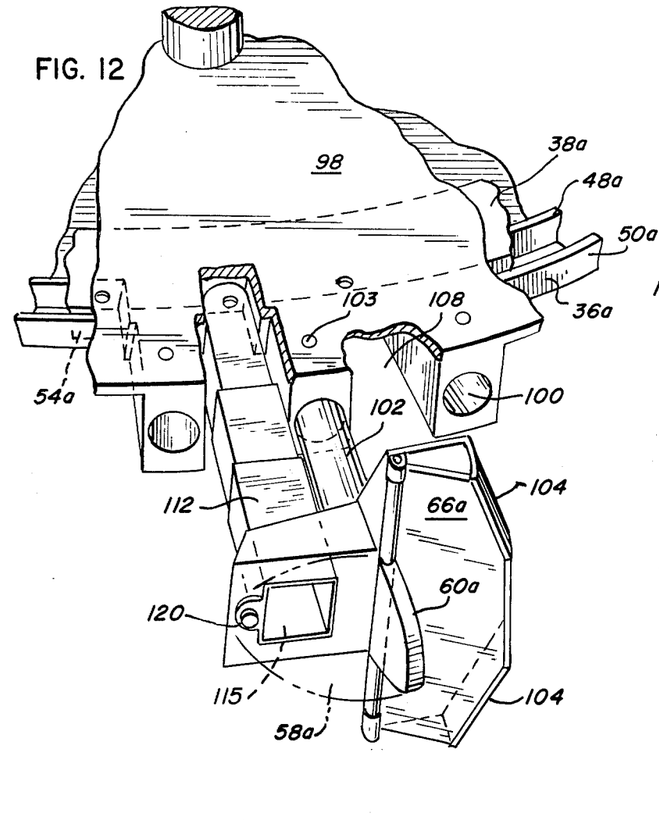
FIG. 12 is a fragmentary, enlarged perspective view of the roller member of FIG. 8.
Figure 13:
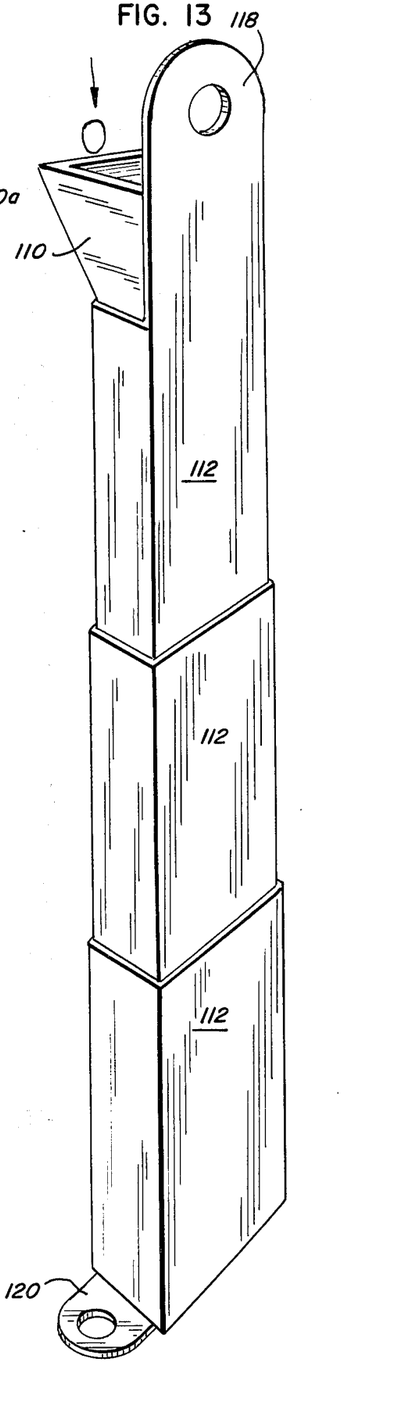
FIG. 13 is a detailed perspective view of telescopically extensible members through which seed is delivered to the protrusions.

As shown in FIG. 15, telescoping member 112 is removable by the opening of bolt 116, which affixes flange 118 of the uppermost telescoping member 112 to wheel hub 98. The bottommost telescoping member 112 may have an additional flange 129 for attachment by another bolt to protrusion 58a, as shown in FIG. 12.

Since it is desirable, for the most effective operation of roller 74, for all spokes 102 to be of uniform radial distance at any one time, the following mechanism is provided to conveniently permit the uniform radial adjustment of the structure of FIGS. 8 through 17.

As shown in FIG. 17, protrusion 58a is attached to a bracket plate member 122, having upstanding walls 124 defining apertures 126 for a pin to pass through. Rearwardly of protrusion 58a is a second pair of upstanding walls 128, as part of bracket plate member 122, defining a pair of parallel slots 130. Walls 124 are positioned somewhat closer together than walls 128, so that walls 124 can fit between the walls 128 of a neighboring bracket plate member 122.

Accordingly, as shown in FIGS. 8 and 16, the adjacent bracket plates 122, some carrying cleat members 102, and some carrying protrusions 58a, are secured together, with each set of upstanding walls 124 of one bracket plate member 122 fitting within the upstanding walls 128 of an adjacent bracket plate member. Pins 132 pass through holes 126 and reside within slots 130.

Accordingly, it becomes possible to adjust the circumference of roller 74 by loosening bolts 105 (FIG. 10), which engage spokes 102. Bolts 105 pass through and threadedly engage transverse apertures 103, to press against and retain each spoke securely in apertures 100.

After bolts 105 have been loosened, spokes 102 can be radially expanded or contracted in radial apertures 100. However, due to the presence of pins 132 in holes 126 and slots 130, they will all exhibit an equal radial extension. Thus each roller 74 can be lifted off the ground, and quickly adjusted to a desired spacing of protrutions 58a by altering the radius of roller 74, without the need to individually adjust each individual spoke 102. Thereafter, bolts 105 may be tightened, and the roller used to apply a new seed distribution pattern.

If it is desired to remove a spoke 102, pins 132 restraining the particular spoke can be removed, and the spoke in turn removed and replaced with another spoke. Such a spoke may, for example, carry a cleat member 106 if the previous spoke had a protrusion 58a, or vice versa as desired. Accordingly the pattern shown in FIG. 8 of 30° angular spacing of protrusions 58a (12 protrusions on the roller) can be changed to, for example, a 45° spacing (8 protrusions on the roller), for wider seed spacing.

It should be also noted that slots 130 permit motion of pins 132 in slots 130 (see FIGS. 8 and 16), to accomodate for a change in the length of the circumference, as the radius of roller 74 is adjusted. Angles 113 (FIG. 16) between the bracket bottoms 131 and spokes 102 are 82 ½° to facilitate such motion, each slot 130 being parallel to its associated bracket bottom 131.

Figure 14:
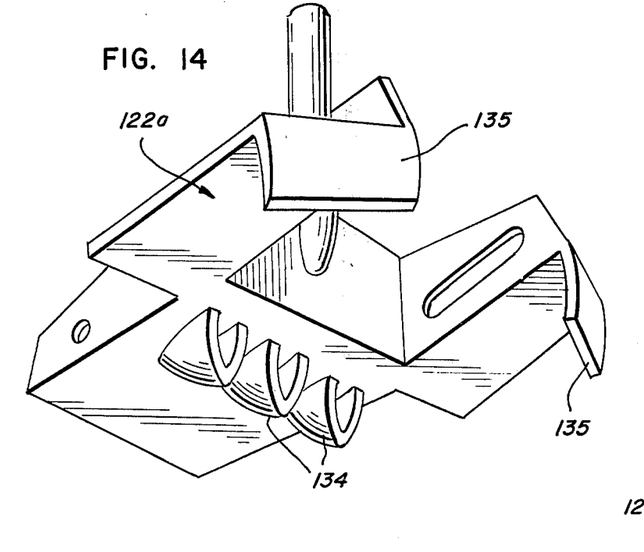
FIG. 14 is a perspective view of an alternative embodiment of the protrusions and shovel means of this invention.

FIG. 14 shows an alternate bracket member 122a, which carries a plurality of protrusions 134, and shovel members 135, with the typical closure member, hinge, spring, and foot structure described previously being omitted. This sort of structure is useable for the planting of grass seed, where extremely close spacing is desired.

Figures 18, 20:
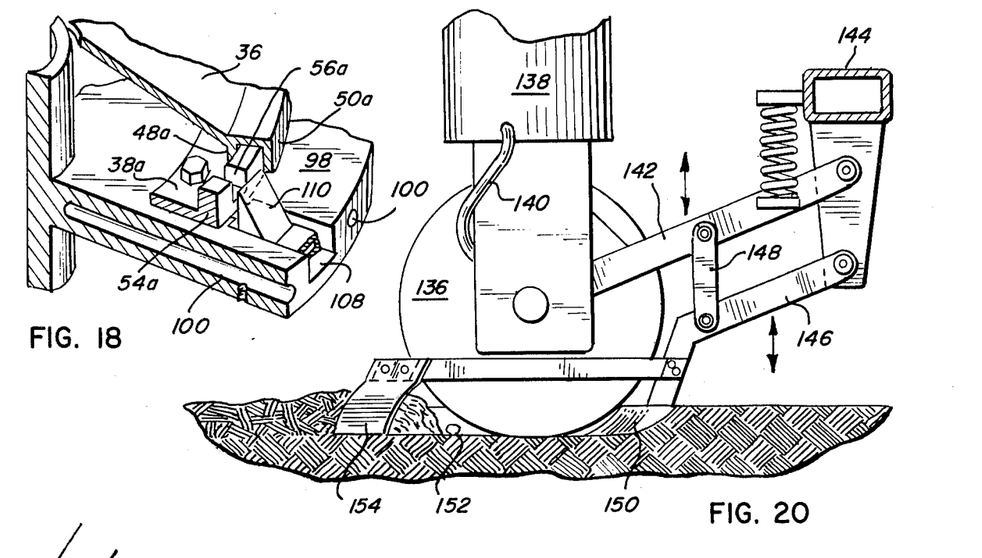
FIG. 18 is a perspective view, with parts broken away, of the seed distribution mechanism shown in exploded configuration in FIGS. 10 and 11.
FIG. 20 shows an alternative embodiment of a seed metering device of this invention.

FIG. 20 shows an alternative embodiment for a seed metering device. Roller 136 may be similar to either of the rollers of the previous embodiment, or may lack protrusions altogether as shown. Seed tank 138 is connected to roller 136 by seed tube 140, the seed being distributed in a manner described previously.

Roller 136 is suspended on an arm 142, being pivotally spring mounted onto a tool bar 144 in a manner similar to that shown in FIG. 1.

In this embodiment, a second arm 146 is connected to arm 142 by link 148 so that the arms 142, 146 move over bumps in the ground and the like in unison. Forward plow 150 is attached to arm 146, for digging a furrow in the ground in which roller 136 rolls. After seeds 152 are dropped and distributed in uniform manner in the furrow, a pair of rear plows 154 close the furrow as indicated.

This permits the use of the seed metering roller features of this invention in conjunction with the presently conventional plowed furrow approach to seed planting.

FIG. 21 shows a single roller 156, which can be made in accordance with this invention for individual seed planting. Protrusions 158 are shown for the same purpose as the previously described protrusions 58 and 58a.

Seed container 160 and seed tube 162 function as in the previous embodiment. Roller 156 may be of the design of either of the previous embodiments.

In this device, it may also be desirable to provide a second container 164 adjacent to container 160, and a second container 164 adjacent to container 160, and a second distribution tube 166. In this case, seed distribution tube 162 communicates with every second protrusion 158, through a first seed distribution system 165 on one side of roller 156, similar to that shown previously. The second tube 166 leads to the remaining protrusions by a second, similar seed distribution system 167 on the other side of the roller 156. By this, fertilizer, herbicides, or the like can be delivered to one of the alternating sets of protrusions, while seed is delivered to the other.

The device has handlebars 170 for hand operation.

Furthermore, self-propelled embodiments of the roller of this invention can be built, by connecting a conventional motor to the rollers through a transmission.

Accordingly, the above invention provides a means for planting seed, fertilizer, herbicides, and the like in a precisely defined and adjustable pattern, and for thereafter covering the seeds.

The device is relatively simple in its operation, and can be energy saving, in that the tractor pulling the rollers of this invention may not be required to open, and then close, a large number of furrows for seed planting. This has the added advantage that planting in accordance with this invention can take place through stubble, if desired, with the resultant avoidance of the need to plow the field prior to planting. Additionally, in dry areas, the stubble, or even sod, can serve as a moisture protective layer, preventing the loss of the immense amounts of soil moisture which take place from a plowed field. Accordingly, this facilitates the planting of crops in areas which, at the present time, are better used as grasslands because of the low moisture conditions, making plowing inadvisable.

Furthermore, the device can be easily assembled and disassembled, for convenient shipping in several relatively small packages.

The above has been offered for illustrative purposes only, and is not intended to limit the scope of this invention, which is as described in the claims below.

That which is claimed is:

1. In a seed-planting device having a roller member positioned for rolling contact with the ground; protrusions carried on the periphery of said roller member for producing holes in the ground and thereafter withdrawing therefrom while rolling; and means for depositing seed and the like into said holes through said protrusions; the improvement comprising, in combination: said protrusions being carried on peripherally-mounted bracket plate members; radially-mounted, adjustable spokes secured to said bracket plate members at the ends thereof; means for varying the extension of said spokes to pre-set said roller member circumference prior to use, while holding the extension of said spokes and said circumference constant during use; and sliding linking means connecting said bracket plate members, whereby said bracket plate members and protrusions may be uniformly moved radially inwardly and outwardly by adjustment of said spokes to adjust the peripheral distance between said protrusions, said sliding linking means including wall members extending inwardly from said roller periphery, said wall members being carried by said peripherally-mounted bracket plate members, the wall members of said plate members overlapping adjacent wall members of adjacent bracket plate members, and defining generally circumferentially directed slots, and a pin member carried by each said plate member and slideable in the slot of each said overlapping wall member to slidingly connect adjacent bracket plate members, whereby the radially inward and outward movement of said connected bracket plate members is uniform.

2. The seed-planting device of claim 1 which defines a stationary, inner, seed storing chamber drum section adjacent said roller member and having a pair of concentric, stationary peripheral walls; a moveable, inner, peripheral ring positioned between said stationary walls, and connected to said roller member, said moving inner peripheral ring defining spaced seed storing chambers for receiving a small number of seeds and the like; aperture means at a lower portion of the inner of said stationary walls to permit seeds and the like to pass into said seed storing chambers, and thereby to be carried in said aperture means by rotation of said peripheral ring with circumferential motion to a seed drop zone defined by an aperture in the outer of said concentric walls.

3. The seed planting device of claim 1 in which said bracket plate members and spokes which carry said protrusions are removable from said roller member and are replaceable with spokes and bracket plates which do not carry said protrusions, to permit wider spacing of the seed planting sites as said member rotates.

4. The seed planting device of claim 3 in which said roller is mounted on a downwardly-biased, pivotally mounted arm to permit the roller to move upwardly and downwardly in response to hillocks, ruts, and the like.

5. The seed planting device of claim 4 including additional shovel means, carried on the periphery of said roller, for entering the ground adjacent holes produced by said protrusions while rolling, and for dislodging dirt into said holes, to cover seeds and the like deposited therein.

6. The seed-planting device of claim 5 comprising a plurality of rollers, each mounted on a said arm, said arm being pivotally connected to a tool bar, said seed-planting device carrying a seed supply tank, said supply tank having a plurality of outlet ports, and seed conduits communicating between each said roller and an outlet port.

7. In a seed planting device of claim 1 which comprises a forward plow for opening a trench in the ground for depositing a seed and the like therein, and a rearward plow for reclosing said trench, the improvement comprising a roller member positioned for rolling contact with said trench between said forward and rearward plows, said roller defining means about its periphery for depositing seeds with uniform spacing in said trench while rolling.

8. The seed planting device of claim 7 in which said roller is mounted on a downwardly biased, pivotally mounted arm to permit the roller to move upwardly and downwardly in response to hillocks, ruts and the like.

9. In a seed-planting device having a roller member positioned for rolling contact with the ground; protrusions carried on the periphery of said roller member for producing holes in the ground and thereafter withdrawing therefrom while rolling; and means for depositing seed and the like into said holes through said protrusions; the improvement comprising, in combination: said protrusions being carried on peripherally mounted bracket plates; radially mounted adjustable spokes secured to said bracket plates at the ends thereof; means for varying the extension of said spokes to preset said roller member circumference prior to use, while holding the extension of said spokes and said circumference constant during use; and said depositing means including a plurality of tubular seed conduit shaft members each including a plurality of sections connected together in telescoping relationship, each seed conduit communicating with a protrusion.

10. In a seed-planting device having a roller member positioned for rolling contact with the ground, protrusions carried on the periphery of said roller for producing holes in the ground and then for thereafter withdrawing therefrom while rolling, and means for depositing seed and the like into said holes; the improvement comprising, in combination: additional shovel means, carried on the periphery of said roller, for entering the ground adjacent said holes while rolling and for dislodging dirt into said holes, to cover seeds and the like deposited therein, said portrusions each defining a forward wall facing the direction of rotation of said roller member, and an aperture facing away from said direction of rotation; a closure member positioned adjacent said periphery in pivoting relationship thereto, to close said aperture in a first pivoting position, and to open said aperture in a second pivoting position; means for biasing said closure member into said first pivoting position; and a foot member, movable with said closure member between said first and second pivoting positions, rigidly attached at one end to said closure member and positioned essentially tangentially of the periphery of said roller member in said first position, the other end of said foot member being spaced from said periphery in said first position, whereby contact of said foot member with the ground causes said closure member, impelled by said foot member, and said foot member, to assume said second, open position, and release from said ground contact permits said closure member and foot member to return to said first position, said foot member being positioned to sweep across said shovel means to dislodge dirt if present, while moving from said second position to said first position.

11. The seed planting device of claim 10 in which said shovel means comprises plates projecting outwardly from the periphery of said roller member, said plates inclining in the direction of rotation of said roller member, and positioned to dislodge dirt into the hole made by a protrusion which is adjacent each said plate, and spaced therefrom in said direction of rotation.

12. The seed planting device of claim 11 in which the forward walls of said protrusions are convex.

13. The seed-planting device of claim 10 in which said protrusions are carried by separate, peripheral first bracket plate members, said peripheral bracket plate members being carried on the ends of first radially-mounted extensible spokes; and sliding link members connecting said peripheral bracket plate members, whereby said first peripheral bracket plate members may be uniformly moved radially inwardly and outwardly by adjustment of said extensible spokes, to adjust the peripheral spacing between said protrusions carried on said peripheral bracket plate members.

14. The seed-planting device of claim 13 which includes extensible tubular seed supply shafts comprising a plurality of tubular members, connected together in telescoping relationship, each communicating with a protrusion.

15. The seed-planting device of claim 13 in which peripheral, second bracket plate members are positioned between the first bracket plates, and are carried on the ends of second, radially-mounted, extensible spokes, and sliding linking means connecting said first and second bracket plates together, said second peripheral bracket plates carrying cleat members to prevent sliding of said roller member on the ground.

16. The seed-planting device of claim 15 in which said sliding linking means of the peripheral bracket plate members are defined by slotted wall members extending inwardly from said roller periphery, said wall members being carried by said plate members, the slotted wall members of said plate members overlapping adjacent plate member walls and defining generally circumferentially directed slots, and a pin member carried by each said adjacent plate member and slideable in the slot of an overlapping wall member, to slidingly connect adjacent plate members, whereby the radially inward and outward movement of said connected peripheral plate members is uniform.

17. The seed-planting device of claim 16 which defines a stationary, inner seed storing chamber drum section adjacent to said roller member and having a pair of concentric, stationary, peripheral walls; a rotatable peripheral ring positioned between said stationary walls, and connected to said roller member, said moving inner peripheral ring defining spaced seed storing chambers for receiving a small number of seeds and the like; aperture means at a lower portion of the inner of said stationary walls to permit seeds and the like to pass into said seed storing chambers, and thereby to be carried in said chambers by rotation of said peripheral ring with circumferential motion to a seed drop zone defined by an aperture in the outer of said concentric walls.

18. The seed planting device of claim 16 in which said bracket plate members and spokes which carry said protrusions are removable from said roller member and are replaceable with spokes and bracket plates which do not carry said protrusions, to permit wider spacing of the seed planting sites as said roller member rotates.

19. The seed-planting device of claim 16 which includes twenty-four of said spokes uniformly and radially spaced about the circumference of said roller.

20. The seed-planting device of claim 19 in which each slot defines an angle of essentially 82 ½° to the spoke which carries said bracket plate defining said slot.

21. The seed-planting device of claim 10 in which said closure member is positioned radially of said roller member in said first, aperture-closing position.

* * * * *